(12) United States Patent
Huang et al.

(10) Patent No.: US 9,971,205 B2
(45) Date of Patent: May 15, 2018

(54) LIQUID CRYSTAL DISPLAY PANEL

(71) Applicant: Shenzhen China Star Optoelectronics Technology Co., Ltd., Shenzhen, Guangdong (CN)

(72) Inventors: Tienchun Huang, Guangdong (CN); Yuan Xiong, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 105 days.

(21) Appl. No.: 14/430,201

(22) PCT Filed: Sep. 11, 2014

(86) PCT No.: PCT/CN2014/086256
§ 371 (c)(1),
(2) Date: Mar. 20, 2015

(87) PCT Pub. No.: WO2016/026175
PCT Pub. Date: Feb. 25, 2016

(65) Prior Publication Data
US 2016/0252762 A1    Sep. 1, 2016

(30) Foreign Application Priority Data
Aug. 21, 2014   (CN) .......................... 2014 1 0415973

(51) Int. Cl.
*G02F 1/1339* (2006.01)
*G02F 1/1335* (2006.01)

(52) U.S. Cl.
CPC ........ *G02F 1/1339* (2013.01); *G02F 1/13394* (2013.01); *G02F 1/133514* (2013.01); *G02F 2001/13396* (2013.01)

(58) Field of Classification Search
CPC .................................................... G02F 1/1339
See application file for complete search history.

(56) References Cited

U.S. PATENT DOCUMENTS

2014/0320789 A1*  10/2014  Son ........................ G02F 1/1337
                                                                       349/123
2015/0370116 A1*  12/2015  Chae ................... G02F 1/13394
                                                                         349/43

FOREIGN PATENT DOCUMENTS

CN              1696776 A       11/2005
CN           101093322 A       12/2007
(Continued)

*Primary Examiner* — Edmond Lau
(74) *Attorney, Agent, or Firm* — Andrew C. Cheng (57) ABSTRACT

A liquid crystal display panel includes an array substrate (1), a CF substrate (2) arranged to correspond to the array substrate (1), liquid crystal filled between the array substrate (1) and the CF substrate (2), enclosing resin (3) coated between the array substrate (1) and the CF substrate (2), and a photosensitive gap material barrier (4) arranged between the array substrate (1) and the CF substrate (2). The photosensitive gap material barrier (4) is arranged to circumferentially surround an outer periphery of a display zone (6) of the liquid crystal display panel. The photosensitive gap material barrier (4) has a height that is less than a distance between the array substrate (1) and the CF substrate (2). The photosensitive gap material barrier (4) includes a plurality of recessed cavities (41) formed therein. The liquid crystal display panel prevents air bubbles of the outer periphery of the display zone from spreading into the display zone to cause abnormal displaying and enhances the displaying quality of the liquid crystal display panel and improves product yield rate.

8 Claims, 7 Drawing Sheets

(56) References Cited

FOREIGN PATENT DOCUMENTS

| CN | 103454813 A | 12/2013 |
| CN | 103984146 A | 8/2014 |

\* cited by examiner

LIQUID CRYSTAL DISPLAY PANEL

BACKGROUND OF THE INVENTION

1. Field of the Invention

The present invention relates to the field of display technology, and in particular to a liquid crystal display panel.

2. The Related Arts

Liquid crystal displays (LCDs) have a variety of advantages, such as thin device body, low power consumption, and being free of radiation, and are thus widely used, such as liquid crystal televisions, mobile phones, personal digital assistants (PDAs), digital cameras, computer monitors, and screens of notebook computers.

A liquid crystal display generally comprises an enclosure, a liquid crystal panel arranged in the enclosure, and a backlight module mounted in the enclosure. The structure of a liquid crystal display panel is generally made up of a thin-film transistor (TFT) array substrate, a color filter (CF) substrate 300, and a liquid crystal layer arranged between the two substrates and the operation principle is that a drive voltage is applied between the two glass substrates to control liquid crystal molecules contained in the liquid crystal layer to rotate so as to refract out the light from the backlight module to generate an image.

With the development of the liquid crystal displaying technology, a series of new techniques that improve color saturation, brightness, and contrast of the liquid crystal display panels are emerging and COA (Color Filter on Array) technique is one of these techniques. The COA technique allows color resists to be formed on the array substrate to provide the liquid crystal display panel with a COA structure, of which the advantages are generally being capable of increasing pixel aperture ratio and the displaying quality of the liquid crystal display pane, allowing for application to high-level products. Further, a COA structure liquid crystal display panel is free of the issue of alignment between the CF glass substrate and the array substrate and may reduce the difficulty of a manufacturing process.

However, the COA technique also suffers certain problems. It is often that air bubbles are generated in an assembling process of a liquid crystal display panel and a COA structure liquid crystal display panel has a structural feature that is even easier to generate gaps and thus air bubbles. Such bubbles, if spreading to a display zone of the liquid crystal display panel leads to the occurrence of abnormal displaying and thus affecting the displaying quality of the liquid crystal display panel and resulting in lowering of product yield rate.

SUMMARY OF THE INVENTION

An object of the present invention is to provide a liquid crystal display panel, which prevents air bubbles from spreading from a periphery of a display zone into the display zone to cause abnormal displaying, enhances displaying quality of the liquid crystal display panel, and improves product yield rate.

To achieve the above object, the present invention provides a liquid crystal display panel, which comprises an array substrate, a color filter (CF) substrate arranged to correspond to the array substrate, liquid crystal filled between the array substrate and the CF substrate, enclosing resin coated between the array substrate and the CF substrate, and a photosensitive gap material barrier arranged between the array substrate and the CF substrate. The photosensitive gap material barrier is arranged to circumferentially surround an outer periphery of a display zone of the liquid crystal display panel. The photosensitive gap material barrier has a height that is less than a distance between the array substrate and the CF substrate. The photosensitive gap material barrier comprises a plurality of recessed cavities formed therein.

The photosensitive gap material barrier is provided on the CF substrate and forms a gap with respect to the array substrate.

The photosensitive gap material barrier is located between the enclosing resin and the display zone and forms a gap with respect to each of the enclosing resin and the display zone.

A portion of the photosensitive gap material below the recessed cavities has a height that is less than the height of the photosensitive gap material barrier.

The recessed cavities extend through the photosensitive gap material barrier to each show a hollowed structure.

The plurality of recessed cavities is arranged in an alternating fashion in the photosensitive gap material barrier.

The array substrate that is opposite to the photosensitive gap material barrier is provided with a color resist layer.

The color resist layer comprises pits formed therein to correspond to the recessed cavities.

The color resist layer comprises pits formed therein to alternate with the recessed cavities.

The efficacy of the present invention is that the present invention provides a liquid crystal display panel, wherein a photosensitive gap material barrier that is enclosed is arranged along an outer periphery of a display zone and the photosensitive gap material barrier is provided with a plurality of recessed cavities so as to change flowability of liquid crystal and air bubbles passing through the photosensitive gap material barrier so as to block or collect the air bubbles therein to prevent the air bubbles from spreading into the display zone to cause abnormal displaying thereby improving the displaying quality of the liquid crystal display panel and also effectively increasing product yield rate to ensure productivity without including additional manufacturing process.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Referring to FIGS. 1-4, the present invention provides a liquid crystal display panel. The liquid crystal display panel comprises an array substrate 1, a color filter (CF) substrate 2 arranged to correspond to the array substrate 1, liquid crystal (not shown) filled between the array substrate 1 and the CF substrate 2, enclosing resin 3 coated between the array substrate 1 and the CF substrate 2, and a photosensitive gap material barrier 4 arranged between the array substrate 1 and the CF substrate 2.

Figure 1:
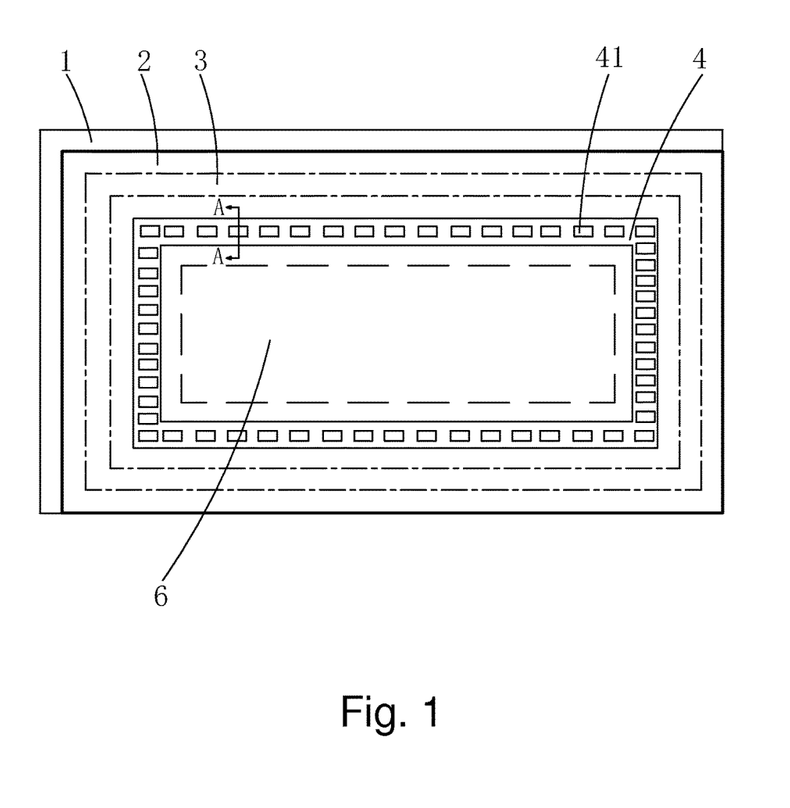
FIG. 1 is a top plan view of a structure of a liquid crystal display panel according to the present invention.
Figure 2:
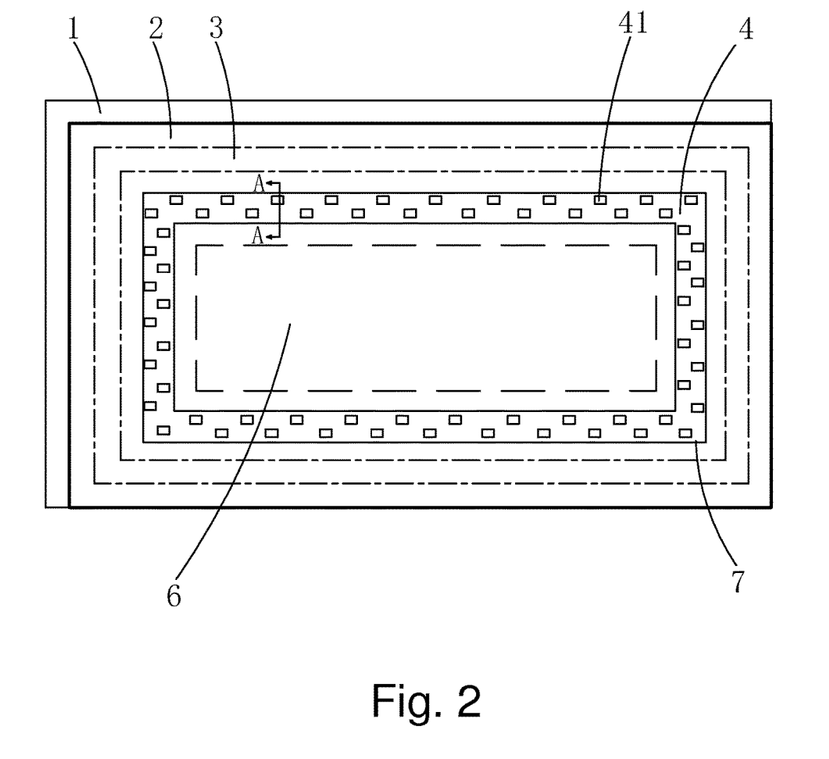
FIG. 2 is a top plan view of another structure of a liquid crystal display panel according to the present invention.

The photosensitive gap material barrier 4 is arranged in an enclosed rectangular form and circumferentially surrounds an outer periphery of a display zone 6 of the liquid crystal display panel. Further, the photosensitive gap material barrier 4 is located between the enclosing resin 3 and the display zone 6 and has a gap with respect to each of the enclosing resin 3 and the display zone 6.

The photosensitive gap material barrier 4 comprises a plurality of recessed cavities 41 formed therein. The plurality of recessed cavities 41 can be of an arrangement as that illustrated in FIG. 1 and is arranged in the photosensitive gap material barrier 4 to align and line up along each of edges of the photosensitive gap material barrier 4. The plurality of recessed cavities 41 can be alternatively of an arrangement as that illustrated in FIG. 2 and is arranged in the photosensitive gap material barrier 4 in an alternating manner along each of the edges of the photosensitive gap material barrier 4.

Figure 3:
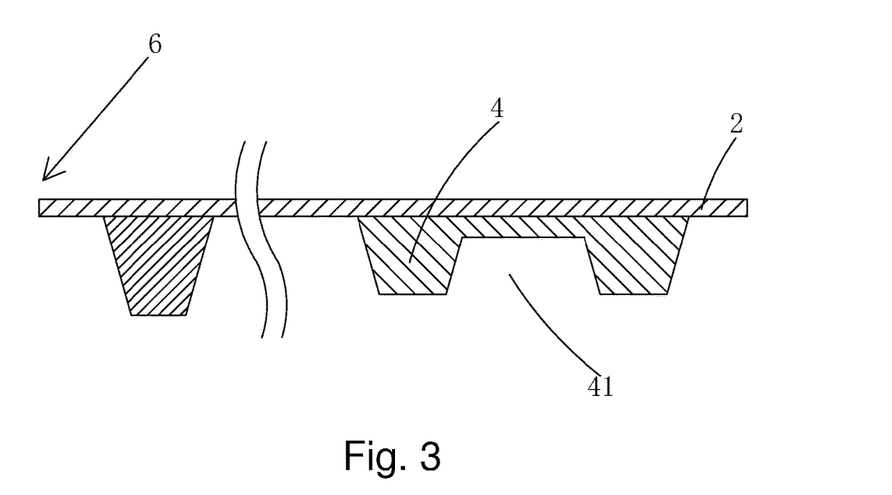
FIG. 3 is a cross-sectional view taken along line A-A of FIG. 1 or 2 to showing a structure of a photosensitive gap material barrier.
Figure 4:
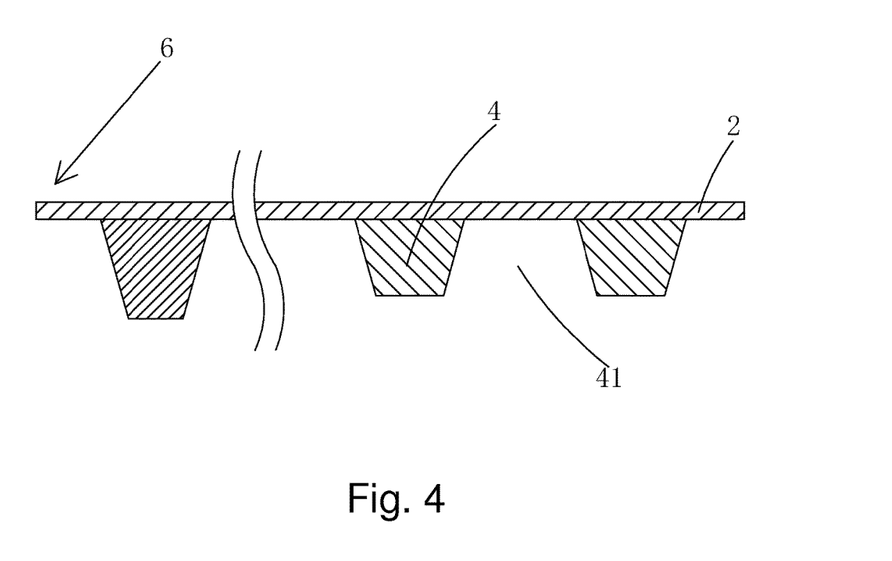
FIG. 4 is a cross-sectional view taken along line A-A of FIG. 1 or 2 to showing another structure of a photosensitive gap material barrier.

Two forms are exemplified to illustrate specific structures of the recessed cavities 41. Referring to FIG. 3, a portion of the photosensitive gap material is located below the recessed cavities 41 and has a height less than a height of the photosensitive gap material barrier 4, and in other words, the recessed cavities 41 each have a side that is open and an opposite side that is closed with the open side facing the array substrate 1; and alternatively, referring to FIG. 4, the recessed cavities 41 each extend completely through the photosensitive gap material barrier 4 to show a hollowed structure and in other words, the recessed cavities 41 each have opposite sides that are both open. The recessed cavities 41 have an effect of changing flowability of liquid crystal and air bubbles passing through the photosensitive gap material barrier 4 so as to block or collect the air bubbles therein to prevent the air bubbles from spreading into the display zone to cause abnormal displaying.

Figure 5:
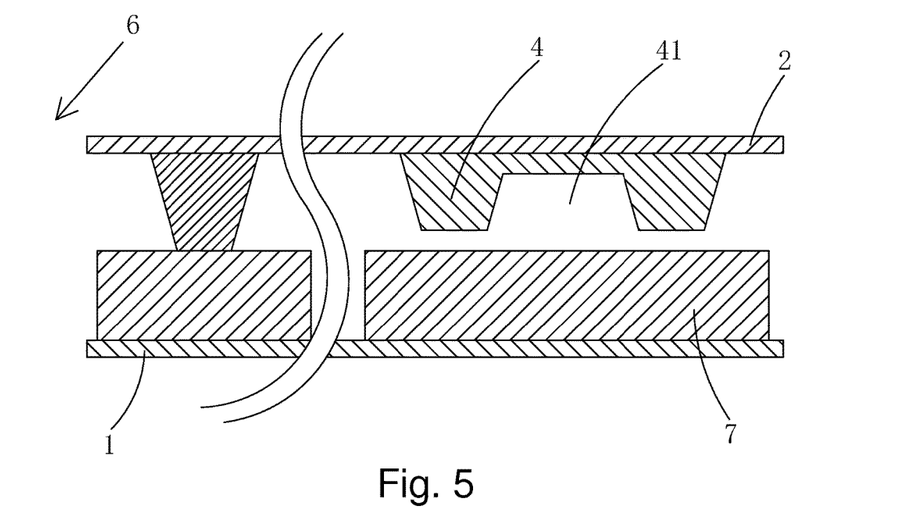
FIG. 5 is a cross-sectional view showing a first embodiment of a liquid crystal display panel according to the present invention having a COA (Color Filter on Array) structure.

Referring to FIG. 5, a cross-sectional view is given to show a first embodiment of a liquid crystal display panel according to the present invention having a COA (Color Filter on Array) structure. The photosensitive gap material barrier 4 is provided on the CF substrate 2 and the photosensitive gap material barrier 4 has a height that is less than a distance between the array substrate 1 and the CF substrate 2. In other words, a gap is present between the photosensitive gap material barrier 4 and the array substrate 1. The array substrate 1 that is opposite to the photosensitive gap material barrier 4 is provided with a color resist layer 7. The recessed cavities 41 are arranged above the color resist layer 7 and form a gap with respect to the color resist layer 7. The helps limit flowability of liquid crystal. In the first embodiment, the portion of the photosensitive gap material that is located under the recessed cavities 41 has a height that is less than the height of the photosensitive gap material barrier 4 and the color resist layer 7 is a unitary solid layer. The recessed cavities 41 help change flowability of liquid crystal and air bubbles passing through the photosensitive gap material barrier 4 so as to block or collect the air bubbles therein to prevent the air bubbles from spreading into the display zone to cause abnormal displaying.

It is apparent that the plurality of recessed cavities 41 can be of an arrangement as that illustrated in FIG. 1 and is arranged to align and line up along each of the edges of the photosensitive gap material barrier 4, and may alternatively be of an arrangement as that illustrated in FIG. 2 and is arranged in an alternating manner along each of the edges of the photosensitive gap material barrier 4.

Figure 6:
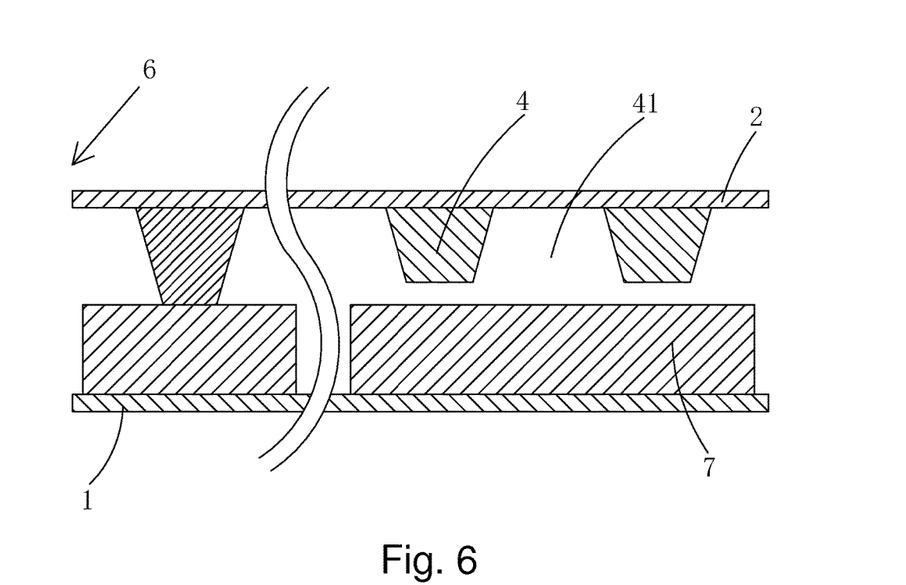
FIG. 6 is a cross-sectional view showing a second embodiment of a liquid crystal display panel according to the present invention having a COA structure.

Referring to FIG. 6, a cross-sectional view is given to show a second embodiment of a liquid crystal display panel according to the present invention having a COA structure. The second embodiment is different from the first embodiment in that the recessed cavities 41 are arranged to completely extend through the photosensitive gap material barrier 4 to each show a hollowed structure, while the remaining parts are identical to those of the first embodiment so that repeated description will be omitted herein.

Figure 7:
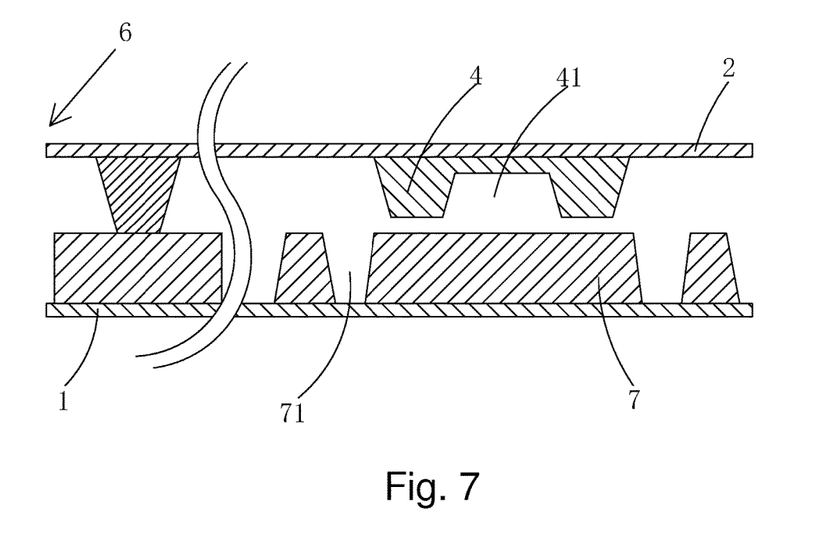
FIG. 7 is a cross-sectional view showing a third embodiment of a liquid crystal display panel according to the present invention having a COA structure.

Referring to FIG. 7, a cross-sectional view is given to show a third embodiment of a liquid crystal display panel according to the present invention having a COA structure. The photosensitive gap material barrier 4 is provided on the CF substrate 2 and the photosensitive gap material barrier 4 has a height that is less than a distance between the array substrate 1 and the CF substrate 2. In other words, a gap is present between the photosensitive gap material barrier 4 and the array substrate 1. The array substrate 1 that is opposite to the photosensitive gap material barrier 4 is provided with a color resist layer 7. The recessed cavities 41 are arranged above the color resist layer 7 and form a gap with respect to the color resist layer 7. The helps limit flowability of liquid crystal. In the third embodiment, the portion of the photosensitive gap material that is located under the recessed cavities 41 has a height that is less than the height of the photosensitive gap material barrier 4. The color resist layer 7 is provided with a plurality of pits 71, and preferably, the number of the pits 71 is two. The two pits 71 are respectively set at opposite sides of the photosensitive gap material barrier 4 and alternate with the recessed cavities 41. The recessed cavities 41 and the two pits 71 provide a collaborative effect of better changing flowability of liquid crystal and air bubbles passing through the photosensitive gap material barrier 4 so as to block or collect the air bubbles therein to prevent the air bubbles from spreading into the display zone to cause abnormal displaying.

It is apparent that the plurality of recessed cavities 41 can be of an arrangement as that illustrated in FIG. 1 and is arranged to align and line up along each of the edges of the photosensitive gap material barrier 4, and may alternatively be of an arrangement as that illustrated in FIG. 2 and is arranged in an alternating manner along each of the edges of the photosensitive gap material barrier 4.

Figure 8:
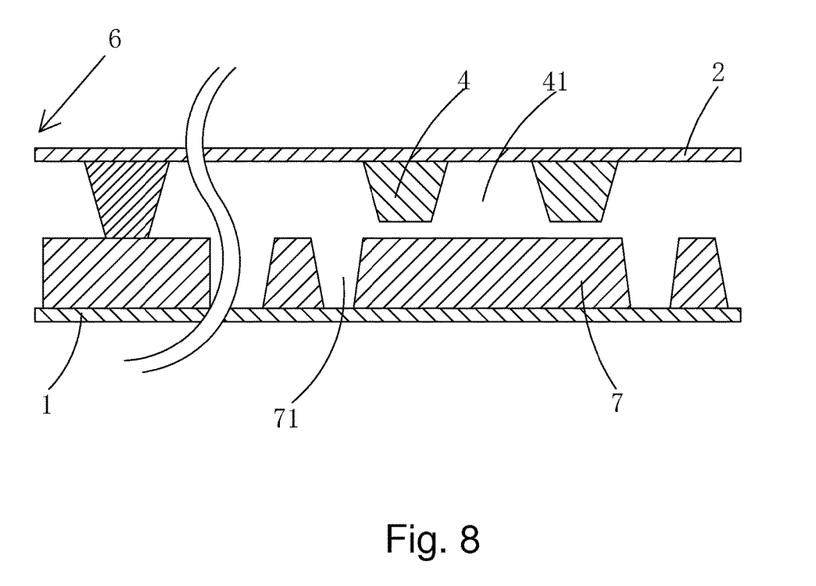
FIG. 8 is a cross-sectional view showing a fourth embodiment of a liquid crystal display panel according to the present invention having a COA structure.

Referring to FIG. 8, a cross-sectional view is given to show a fourth embodiment of a liquid crystal display panel according to the present invention having a COA structure. The fourth embodiment is different from the third embodiment in that the recessed cavities 41 are arranged to completely extend through the photosensitive gap material barrier 4 to each show a hollowed structure, while the remaining parts are identical to those of the third embodiment so that repeated description will be omitted herein.

Figure 9:
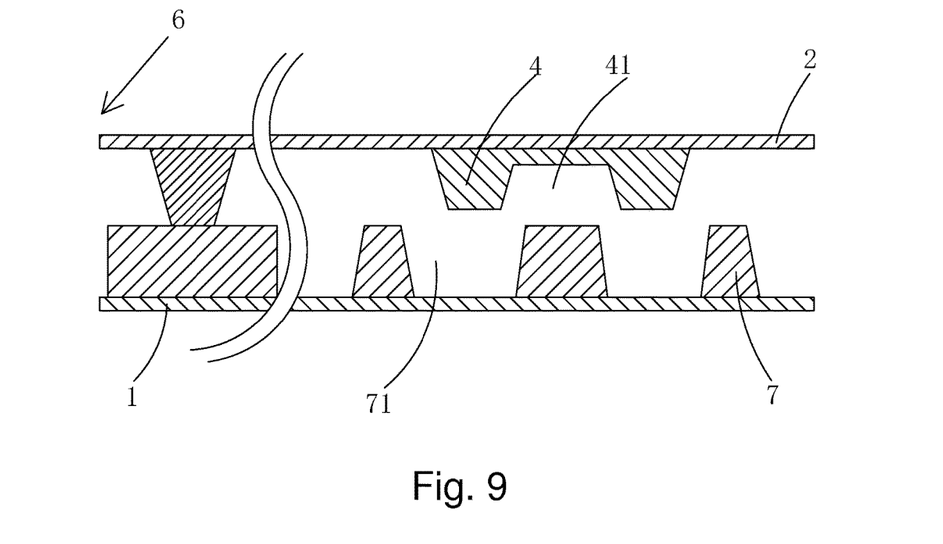
FIG. 9 is a cross-sectional view showing a fifth embodiment of a liquid crystal display panel according to the present invention having a COA structure.

Referring to FIG. 9, a cross-sectional view is given to show a fifth embodiment of a liquid crystal display panel according to the present invention having a COA structure. The photosensitive gap material barrier 4 is provided on the CF substrate 2 and the photosensitive gap material barrier 4 has a height that is less than a distance between the array substrate 1 and the CF substrate 2. In other words, a gap is present between the photosensitive gap material barrier 4 and the array substrate 1. The array substrate 1 that is opposite to the photosensitive gap material barrier 4 is provided with a color resist layer 7. The recessed cavities 41 are arranged above the color resist layer 7 and form a gap with respect to the color resist layer 7. The helps limit flowability of liquid crystal. In the fifth embodiment, the portion of the photosensitive gap material that is located under the recessed cavities 41 has a height that is less than the height of the photosensitive gap material barrier 4. The color resist layer 7 is provided with a plurality of pits 71, and preferably, the number of the pits 71 is two. The two pits 71 are respectively set at opposite sides of the recessed cavities 41 and portions of the pits 71 are located within opening ranges of the recessed cavities 41. The two pits 71 alternate with the recessed cavities 41. The recessed cavities 41 and the two pits 71 provide a collaborative effect of better changing flowability of liquid crystal and air bubbles passing through the photosensitive gap material barrier 4 so as to block or collect the air bubbles therein to prevent the air bubbles from spreading into the display zone to cause abnormal displaying.

It is apparent that the plurality of recessed cavities 41 can be of an arrangement as that illustrated in FIG. 1 and is arranged to align and line up along each of the edges of the photosensitive gap material barrier 4, and may alternatively be of an arrangement as that illustrated in FIG. 2 and is arranged in an alternating manner along each of the edges of the photosensitive gap material barrier 4.

Figure 10:
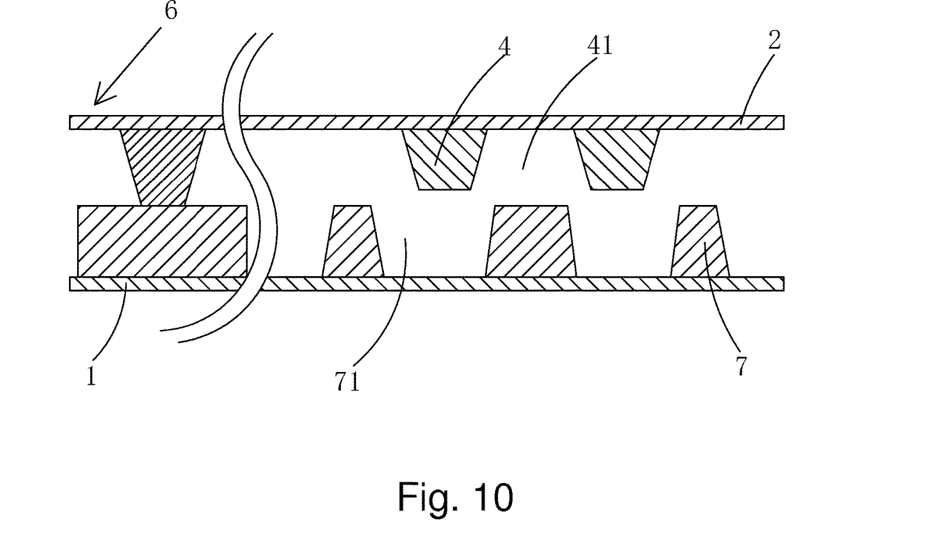
FIG. 10 is a cross-sectional view showing a sixth embodiment of a liquid crystal display panel according to the present invention having a COA structure.

Referring to FIG. 10, a cross-sectional view is given to show a sixth embodiment of a liquid crystal display panel according to the present invention having a COA structure. The sixth embodiment is different from the fifth embodiment in that the recessed cavities 41 are arranged to completely extend through the photosensitive gap material barrier 4 to each show a hollowed structure, while the remaining parts are identical to those of the fifth embodiment so that repeated description will be omitted herein.

Figure 11:
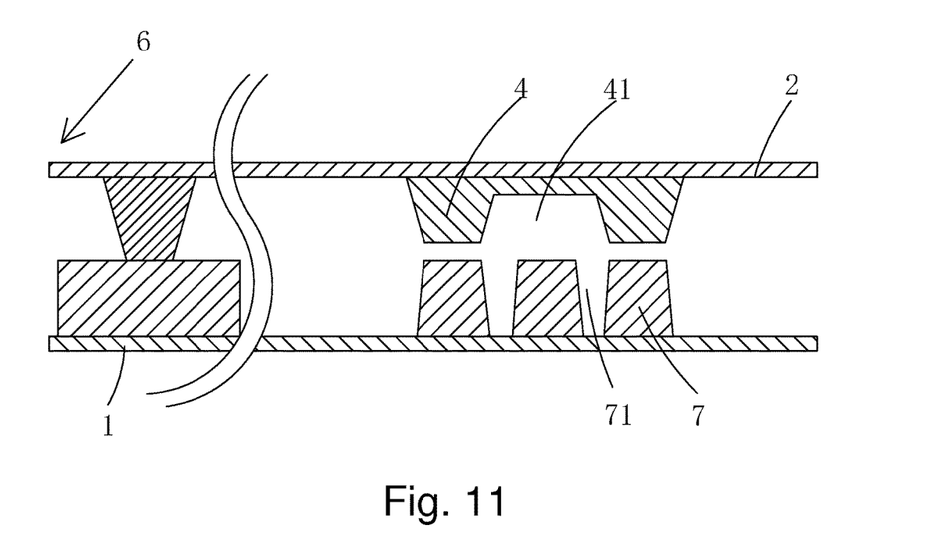
FIG. 11 is a cross-sectional view showing a seventh embodiment of a liquid crystal display panel according to the present invention having a COA structure.

Referring to FIG. 11, a cross-sectional view is given to show a seventh embodiment of a liquid crystal display panel according to the present invention having a COA structure. The photosensitive gap material barrier 4 is provided on the CF substrate 2 and the photosensitive gap material barrier 4 has a height that is less than a distance between the array substrate 1 and the CF substrate 2. In other words, a gap is present between the photosensitive gap material barrier 4 and the array substrate 1. The array substrate 1 that is opposite to the photosensitive gap material barrier 4 is provided with a color resist layer 7. The recessed cavities 41 are arranged above the color resist layer 7 and form a gap with respect to the color resist layer 7. The helps limit flowability of liquid crystal. In the seventh embodiment, the portion of the photosensitive gap material that is located under the recessed cavities 41 has a height that is less than the height of the photosensitive gap material barrier 4. The color resist layer 7 is provided with a plurality of pits 71, and preferably, the number of the pits 71 is two. The two pits 71 are located within opening ranges of the recessed cavities 41 and oppose the recessed cavities 41. The recessed cavities 41 and the two pits 71 provide a collaborative effect of better changing flowability of liquid crystal and air bubbles passing through the photosensitive gap material barrier 4 so as to block or collect the air bubbles therein to prevent the air bubbles from spreading into the display zone to cause abnormal displaying.

It is apparent that the plurality of recessed cavities 41 can be of an arrangement as that illustrated in FIG. 1 and is arranged to align and line up along each of the edges of the photosensitive gap material barrier 4, and may alternatively be of an arrangement as that illustrated in FIG. 2 and is arranged in an alternating manner along each of the edges of the photosensitive gap material barrier 4.

Figure 12:
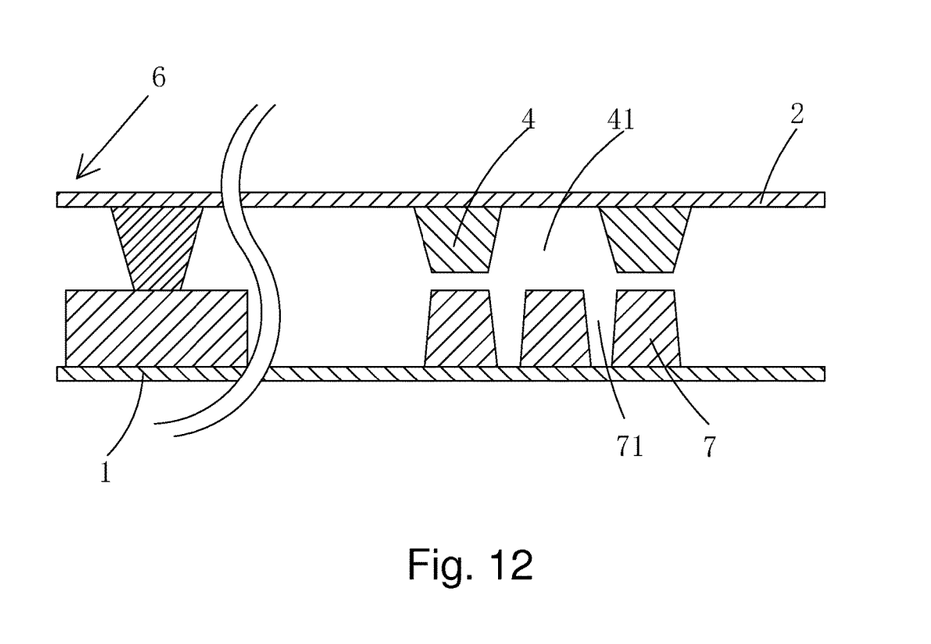
FIG. 12 is a cross-sectional view showing an eighth embodiment of a liquid crystal display panel according to the present invention having a COA structure.

Referring to FIG. 12, a cross-sectional view is given to show an eighth embodiment of a liquid crystal display panel according to the present invention having a COA structure. The eighth embodiment is different from the seventh embodiment in that the recessed cavities 41 are arranged to completely extend through the photosensitive gap material barrier 4 to each show a hollowed structure, while the remaining parts are identical to those of the seventh embodiment so that repeated description will be omitted herein.

In summary, the present invention provides a liquid crystal display panel, wherein a photosensitive gap material barrier that is enclosed is arranged along an outer periphery of a display zone and the photosensitive gap material barrier is provided with a plurality of recessed cavities so as to change flowability of liquid crystal and air bubbles passing through the photosensitive gap material barrier so as to block or collect the air bubbles therein to prevent the air bubbles from spreading into the display zone to cause abnormal displaying thereby improving the displaying quality of the liquid crystal display panel and also effectively increasing product yield rate to ensure productivity without including additional manufacturing process.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display panel, comprising an array substrate, a color filter (CF) substrate arranged to correspond to the array substrate, liquid crystal filled between the array substrate and the CF substrate, enclosing resin coated between the array substrate and the CF substrate, and a photosensitive gap material barrier arranged between the array substrate and the CF substrate, the photosensitive gap material barrier being arranged to circumferentially surround an outer periphery of a display zone of the liquid crystal display panel, the photosensitive gap material barrier having a height that is less than a distance between the array substrate and the CF substrate, the photosensitive gap material barrier comprising a plurality of recessed cavities formed therein;

wherein the photosensitive gap material barrier is located between the enclosing resin and the display zone and is spaced from both the enclosing resin and the display zone and wherein the photosensitive gap material barrier is mounted to the CF substrate and each of the plurality of recessed cavities has a bottom that is spaced from the CF substrate by a portion of the photosensitive gap material barrier such that the bottom is closed by the portion of the photosensitive gap material barrier; and wherein the array substrate comprises a color resist layer that corresponds to and is opposite to the photosensitive gap material barrier and the color resist layer comprises two pits formed therein and respectively set at locations corresponding to opposite sides of the photosensitive gap material barrier, wherein the color resist layer is formed on a surface of the array substrate that faces the CF substrate and each of the pits extends completely through the color resist layer to expose a portion of the surface of the array substrate.

2. The liquid crystal display panel as claimed in claim 1, wherein the photosensitive gap material barrier is provided on the CF substrate and forms a gap with respect to the array substrate.

3. The liquid crystal display panel as claimed in claim 1, wherein the photosensitive gap material barrier is located between the enclosing resin and the display zone and forms a gap with respect to each of the enclosing resin and the display zone.

4. The liquid crystal display panel as claimed in claim 1, wherein the portion of the photosensitive gap material that closes the bottom of each of the recessed cavities has a height that is less than the height of the photosensitive gap material barrier.

5. The liquid crystal display panel as claimed in claim 1, wherein the recessed cavities extend through the photosensitive gap material barrier to each show a hollowed structure.

6. The liquid crystal display panel as claimed in claim 1, wherein the plurality of recessed cavities is arranged in an alternating fashion in the photosensitive gap material barrier.

7. The liquid crystal display panel as claimed in claim 1, wherein the pits of the color resist layer are arranged alternate with the recessed cavities.

8. A liquid crystal display panel, comprising an array substrate, a color filter (CF) substrate arranged to correspond to the array substrate, liquid crystal filled between the array substrate and the CF substrate, enclosing resin coated between the array substrate and the CF substrate, and a photosensitive gap material barrier arranged between the array substrate and the CF substrate, the photosensitive gap material barrier being arranged to circumferentially surround an outer periphery of a display zone of the liquid crystal display panel, the photosensitive gap material barrier having a height that is less than a distance between the array substrate and the CF substrate, the photosensitive gap material barrier comprising a plurality of recessed cavities formed therein;

wherein the photosensitive gap material barrier is provided on the CF substrate and forms a gap with respect to the array substrate;

wherein the photosensitive gap material barrier is located between the enclosing resin and the display zone and forms a gap with respect to each of the enclosing resin and the display zone and wherein the photosensitive gap material barrier is mounted to the CF substrate and each of the plurality of recessed cavities has a bottom that is spaced from the CF substrate by a portion of the photosensitive gap material barrier such that the bottom is closed by the portion of the photosensitive gap material barrier;

wherein the portion of the photosensitive gap material that closes the bottom of each of the recessed cavities has a height that is less than the height of the photosensitive gap material barrier;

wherein the photosensitive gap material barrier is located between the enclosing resin and the display zone and is spaced from both the enclosing resin and the display zone; and wherein the array substrate comprises a color resist layer that corresponds to and is opposite to the photosensitive gap material barrier and the color resist layer comprises two pits formed therein and respectively set at locations corresponding to opposite sides of the photosensitive gap material barrier, wherein the color resist layer is formed on a surface of the array substrate that faces the CF substrate and each of the pits extends completely through the color resist layer to expose a portion of the surface of the array substrate.

* * * * *